Nov. 19, 1963 R. G. SICKERT ETAL 3,111,432

THERMOCOUPLE DEVICE AND METHOD OF MAKING THE SAME

Filed April 18, 1961 2 Sheets-Sheet 1

Inventors.
Richard G. Sickert.
Robert L. Eichhorn.
By Hofgren, Brady, Wegner.
Allen & Stellman.
Attorneys.

THERMOCOUPLE DEVICE AND METHOD OF MAKING THE SAME

Filed April 18, 1961 2 Sheets-Sheet 2

United States Patent Office 3,111,432

Patented Nov. 19, 1963

3,111,432

THERMOCOUPLE DEVICE AND METHOD OF MAKING THE SAME

Richard G. Sickert and Robert L. Eichhorn, Benton Harbor, Mich., assignors to Whirlpool Corporation, a corporation of Delaware Filed Apr. 18, 1961, Ser. No. 103,895
6 Claims. (Cl. 136—4)

This invention relates to a thermocouple unit and a method of making the unit.

Thermocouple units having heat conducting members on opposite sides and a plurality of dissimilar thermoelectric elements connected in electrical series to transfer thermal energy when the series is subjected to a direct current are well known. In general, a pair of the dissimilar thermoelectric elements is used to make a thermocouple and one or more thermocouples are employed to provide an electrical series. In this series the elements and the members joining them in electrical series are so arranged that one side of the unit operates as cold junctions and the other side operates as hot junctions when the direct current is passed through the series. Thus, in normal operation with the direct current flowing therethrough there is a temperature differential between the two sides. This temperature differential may be considerable, particularly when a relatively large plurality of pairs of thermoelectric elements are used in the series. Thus, in one example, the temperature differential on the opposite sides of the unit was approximately 85° F.

In each thermocouple pair one of the elements is identified as an N element which is one having an abundance of electrons and the other is identified as a P element and is one having an abundance of electron vacancies. An example of an N element is one made of bismuth and an example of a P element is one made of antimony.

In order that the thermocouple unit will produce a useful function it is necessary that the opposite sides of the unit be arranged in good heat transfer contact with heat transfer members. This is sometimes difficult to achieve as, because of the temperature differential across the unit, warpage often occurs so that the unit is withdrawn from good thermal contact with the members that are adapted to make good heat transfer relationship with the opposite sides of the unit.

In the present invention there is provided a thermocouple unit in which the unit itself when at room temperature is prestressed and distorted when it is thus out of operation. However, when it is in operation with the direct current flowing therethrough, the temperature differential causes the unit to change its contour or shape and make efficient contact with members that are adapted to utilize the generated relatively high and relatively low temperatures that are present on opposite sides of the thermocouple when it is in this normal operation.

One of the features of this invention therefore is to provide a thermocouple unit having the above characteristics.

Another feature of the invention is to provide an improved method of making such a thermocouple unit.

Other features and advantages of the invention will be apparent from the following description of one embodiment thereof taken in conjunction with the accompanying drawings. Of the drawings.

Figure 1:
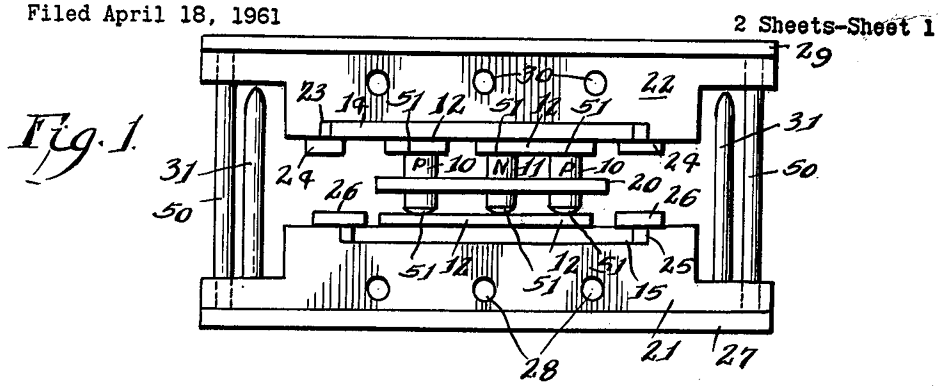
FIGURE 1 is a semi-diagrammatic side elevational view of an apparatus for making a thermocouple unit according to this invention and with parts of the unit shown in position within the apparatus.
Figure 2:
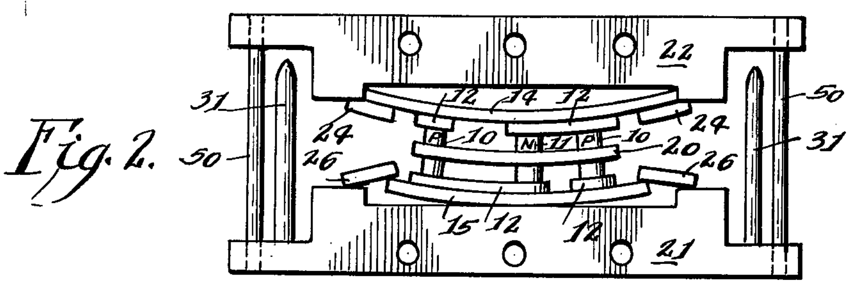
FIGURE 2 is a view similar to FIGURE 1 but showing the thermocouple unit after the illustrated parts have been joined and after it has reached ordinary room temperature.
Figure 3:
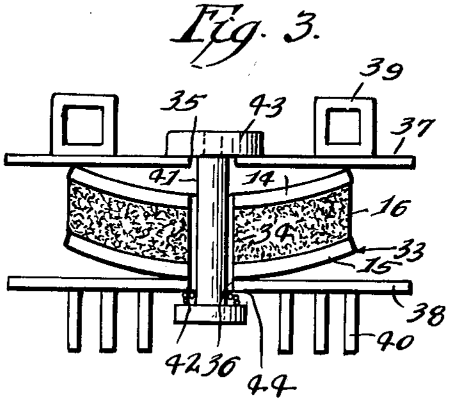
FIGURE 3 is a diagrammatic end elevational view of a thermocouple unit that is out of operation or at ordinary room temperature and located between two heat transfer members.

In FIGURES 1–4 inclusive thicknesses of the parts of the unit are exaggerated for clarity of illustration. Also, the curvature shown for the unit at ordinary non-operating temperatures of FIGURES 2 and 3 is considerably exaggerated also for clarity of illustration.

Figure 5:
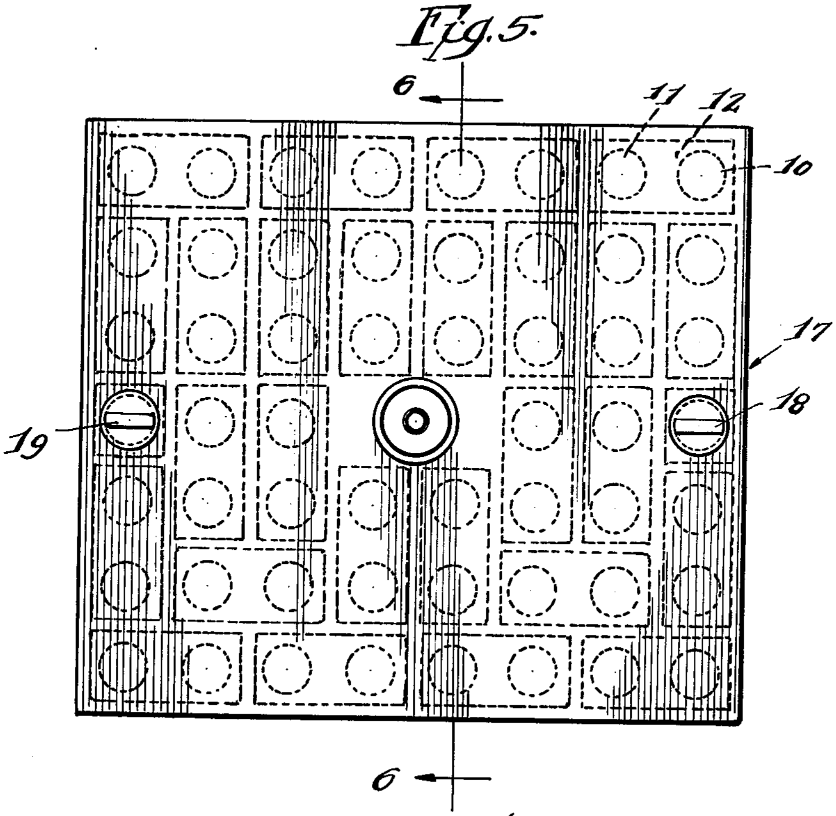
FIGURE 5 is a plan view of a thermocouple unit in operation constructed according to this invention.
Figure 6:
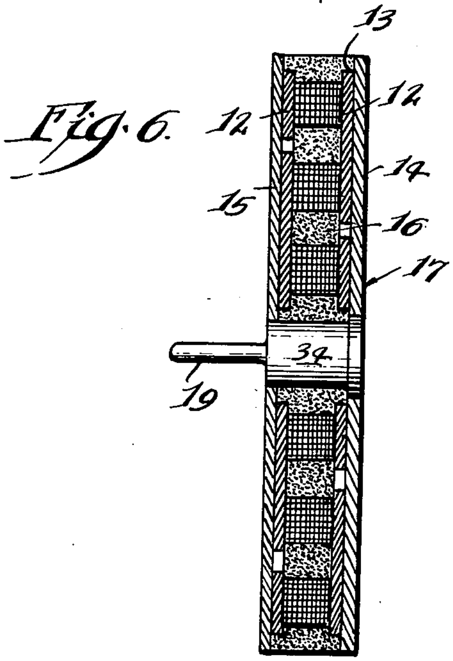
FIGURE 6 is a sectional view taken substantially along the line 6—6 of FIGURE 5.

As shown in FIGURES 5 and 6 of the complete unit, the unit includes a series of dissimilar thermoelectric elements 10 and 11 laterally spaced from each other and having coplanar opposite ends. The elements 10 and 11 are connected in electrical series by a plurality of electrically conducting strips 12 which may be of copper or the like. As is shown in FIGURE 6 these conducting strips are arranged in two sets with the strips in each set being coplanar and with the two sets being substantially parallel to each other. The strips are bonded by means of a thin layer 13 of heat conducting but electrically insulating material to a pair of outer plates 14 and 15 which are parallel to each other. These plates which may be anodized aluminum serve to conduct heat to and from the strips 12 when a direct current is conducted through the electrical series that includes the dissimilar elements 10 and 11 and the connecting strips 12.

Surrounding the elements 10 and 11 and filling the space between the plates 14 and 15 is a foamed-in-place insulation 16 which adheres tenaciously to the surfaces of the strips and plates contacted thereby. Thermoelectric units of this type are disclosed in the copending application of Baer and Lopp Serial No. 735,804, filed May 16, 1958, now abandoned, and assigned to the same assignee as the present application. As is pointed out there, the foamed-in-place insulation may be any of a wide variety of foamed plastics.

The adhesion layer indicated at 13 may be any heat conducting but electrically insulating material and is preferably a resin. An excellent resin for this purpose is an epoxy resin as it is not only electrical insulating but is also adherent to surfaces and particularly metal surfaces and is easily used as it may be supplied in the form of a liquid and may be easily cured either by applying heat or by permitting to set at room temperature to a tough tenacious solid. There are, of course, vast numbers of epoxy resins but so long as they have these characteristics they are usable in this invention. If desired, the resin may contain beryllium oxide as disclosed in Faneuf et al.

application Serial No. 35,044, filed June 9, 1960, and assigned to the same assignee as the present application.

The thermocouple unit 17 of FIGURES 5 and 6 includes a pair of connecting members 18 and 19 that are at the ends of the electric circuit that includes the series connections of the elements 10 and 11 and the connecting strips 12.

The thermocouple unit 17 is shown in FIGURE 6 as being essentially flat. This is the shape it will have when in normal use with a direct current flowing through the electrical series. However, when the unit 17 is at ordinary room temperature or non-operating temperature, the unit will be slightly concavo-convex essentially in the form of a spherical segment.

The unit is prestressed in this manner to have a concavo-convex shape when not in use so that the temperature differential between the two side plates 14 and 15 of the unit when the unit is in operation will cause the unit to distort to the flat shape shown in FIGURE 6 which is its contour when in normal operation. This is done in order that the unit will make intimate heat transfer contact with a pair of rigid heat transfer members 37 and 38 when the unit is in operation. This will be explained in greater detail hereinafter.

One method and apparatus for making the thermocouple unit of this invention is illustrated in FIGURES 1 and 2. As stated previously, the thickness of the parts including the strips 12 and the heat transfer plates 14 and 15 are exaggerated in these figures for clarity of illustration.

In the method of preparing the unit of this invention the elements of the unit are assembled as illustrated. This assembly includes the plurality of dissimilar thermoelectric elements 10 and 11, the plurality of electrically conducting members 12, and a plurality of heat activated bonding means here illustrated as layers of solder 51 located between the opposite end portions of the elements 10 and 11 and the electrically conducting members or strips 12. A typical solder is one containing 50% bismuth, 47.5% tin and 2.5% antimony, all by weight. The elements 10 and 11 are held in openings in a paper board spacer sheet 20 in the customary manner during the assembling operation. It should be noted here that the volumes of solder 51 are of varying thickness during this preliminary assembly. This assembly also includes the plates 14 and 15 which are of a heat conducting material such as aluminum. Before this preliminary assembly has been made, the electrical conducting strips which may be of copper have been previously bonded to the plates 14 and 15 as by the resin previously described.

The above described assembly is placed between platens 21 and 22 that are adapted to be heated or cooled. The plate 14 is held in position in recess 23 in the platen 22 by means of spring loaded clips 24. The plate 15 is held in a similar recess 25 in the other platen 21 by means of similar clips 26. The platen 21 is associated with an electric heater 27 and also contains a plurality of openings 28 for a cooling fluid such as water or air. The other platen 22 is associated with a similar heater 29 and similar openings 30.

When the two platens 21 and 22 are in proper position the top platen 22 is movable toward and away from the other platen 21 on side guide posts 50. The degree of movement of the platen 22 is governed by stops 31. As can be seen in FIGURE 1, the platen 22 is above the stops 31 primarily due to the thickness of the bodies of solder 51 that are still in solid or unmelted condition.

The metal strips 12 and the masses of solder 51 are fluxed prior to their assembly in the position shown in FIGURE 1. A typical flux is one containing 50% zinc chloride and 50% concentrated hydrochloric acid, both by weight.

The solder 51 is one that melts at approximately 275° F. Any solder can be used that will adhere to the copper strip 12 and to the thermoelectric elements 10 and 11.

After the assembly of FIGURE 1 is completed, heat is applied by means of the heaters 27 and 29 until the temperature of the entire assembly reaches approximately 325° F. This of course is well above the melting point of the solder. This temperature is maintained constant until the solder becomes molten at which time the upper platen 22 settles down onto the tops of the spacers or stops 31. While in this molten condition any of the elements 10 and 11 which may have been slightly off the vertical will line up so that all are substantially vertical (as viewed in FIGURE 1) and substantially parallel. Any differences in the lengths of the elements are made up for by differences in thickness of the molten solder. The stops 31 therefore determine the over-all thickness of the thermocouple unit.

Assuming that the bottom plate 15 is to be used as the cold junction and the top plate 14 is to be used as the hot junction and that during the normal operation the temperature difference across the thermocouple unit or at the heat transfer plates 14 and 15 is 85° F., the lower platen 21 is cooled either by reducing the temperature in the heater 27 or by forcing cooling fluid through the openings 28 so as to decrease the temperature in the plate 15. During this initial heat lowering the temperature in the plate 14 is maintained at approximately its previous 325° F. The lowering in temperature is continued until the lower plate 15 reaches a temperature 85° F. less than that of plate 14 or a temperature of 240° F. By this time, of course, the molten solder 51 at the bottoms of the elements 10 and 11 has become solid. Both plates 14 and 15 are then cooled at substantially the same degree in the same manner as previously described while maintaining this 85° temperature differential between the plates 14 and 15. This lowering of the temperature is continued until the temperature of the top plate 14 is below 275° F. or the melting point of its solder. The solder thereupon of course becomes solid in its turn. The entire assembly is then cooled to room temperature. Because of the constant 85° F. temperature differential of plates 14 and 15 as the plates are conducted through the set point temperatures for the solder, the plates 14 and 15 will remain substantially parallel to each other and substantially flat. This of course is a normal operating contour of the thermocouple unit. However, when the unit is cooled to room temperature the plate 15 which is intended to be the cold side of the unit will be outwardly convex, as shown in FIGURE 2, while the plate 14 which is intended to be the hot side of the unit is outwardly concave, also as viewed in FIGURE 2. This prestressed condition at room temperature is brought about because the unit was soldered with its opposite plates 14 and 15 held at two different temperatures which differed from each other by the temperature differential at which the unit is intended to be operated.

This prestressed condition takes place while the parts are being cooled to room temperature as previously described. The buckling movement of the plates 14 and 15 is permitted by the spring pressed clips 24 and 26 which are movable under pressure.

Upon reaching room temperature the assembly of plates 14 and 15, the thermoelectric elements 10 and 11 and strips 12 are removed from the platen device and all flux is removed from the elements 10 and 11 and the strips 12 in a well known washing operation. At the same time the spacer sheet 20 is removed as it is, of course, now no longer necessary.

The space between the plates 14 and 15 surrounding the elements 10 and 11 and the strips 12 is then filled with an insulation 16 which is preferably a foamed-in-place insulation. Such a foamed-in-place insulation may be polystyrene.

Figure 4:
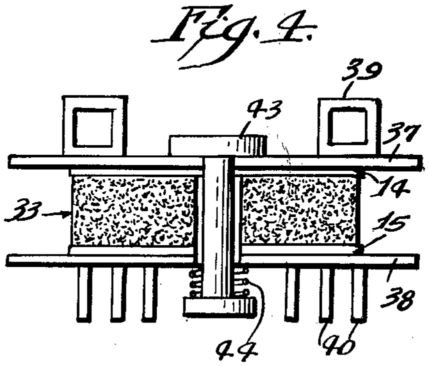
FIGURE 4 is a view similar to FIGURE 3 but illustrating the relative positions of the unit and the heat transfer members when the unit is in its normal operation with a direct current flowing therethrough.

In FIGURES 3 and 4 there is shown diagrammatically a thermoelectric unit 33 embodying the features of this invention in which the thermoelectric elements 10 and 11 are hidden by the insulating material 16. In FIGURE 3 the unit 33 is at ordinary room temperature, or non-operating temperature, while in FIGURE 4 the unit 33 is at its normal operating temperature with a temperature differential of 85° F. between the hot plate 14 and the cold plate 15.

In the assembly of FIGURES 3 and 4 an opening 34 is made at the center of the unit 33. Similar openings 35 and 36 are made in heat transfer plates 37 and 38. Heat transfer plate 37 is provided with cooling duct 39 through which a cooling fluid may be passed for carrying heat away from the hot plate 14 that is conducted through the transfer plate 37. Plate 38 is provided with spaced fins 40 for conducting heat from the atmosphere to the cold plate 15 by means of the heat transfer plate 38.

In order to hold the assembly together, a bolt 41 is provided with a head 42 on one end beyond the transfer plate 38 and a nut 43 on the other end beyond the transfer plate 37. A coil spring 44 or similar device such as a Belleville washer (not shown) is provided between the head 42 and the transfer plate 38 urging the head away from the plate. Then, when the thermocouple unit 33 is in normal operation with the temperature differential of 85° F. between the plates 14 and 15, the unit 33 will assume a flat condition and the spring 44 will hold the transfer plates 37 and 38 against their respective heat transfer surfaces of the unit 33.

As can be seen from the above description of the invention and of one embodiment thereof, the thermocouple unit 33 is distorted as shown in FIGURE 3 under non-operating condition. Then, when a direct current is passed through the unit in the normal manner, the unit begins to straighten out and as soon as the normal operating temperature differential between the hot side and the cold side has been achieved, the unit assumes a contour such as the flattened condition of FIGURE 4 to make intimate heat transfer contact with the heat transfer members 37 and 38. Under the pre-stressed conditions of FIGURE 3, the unit is concavo-convex and has the shape substantially of a segment of a spherical surface.

Having described our invention as related to the embodiment shown in the accompanying drawings, it is our intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. The method of making a thermocouple unit having a desired contour when in operation and subjected to a temperature differential on opposite sides thereof when in said operation, comprising: assembling elements of said unit including a plurality of dissimilar thermoelectric elements, a plurality of electrically conducting members arranged to provide said dissimilar thermoelectric elements and said members in electrical series and a plurality of heat activated bonding means operable at a predetermined elevated temperature to bond said thermoelectric elements and said electrically conducting members together in said series; heating said opposite sides and thus said elements to a temperature above said predetermined temperature; and cooling said sides while maintaining temperatures at said sides to produce substantially said temperature differential thereat and maintaining said desired contour until both sides are at temperatures less than said predetermined temperature to bond said thermoelectric elements and electrically conducting members together.

2. The method of making a thermocouple unit having a desired contour when in operation and subjected to a temperature differential on opposite sides thereof when in said operation, comprising: assembling elements of said unit including a plurality of dissimilar thermoelectric elements, a plurality of electrically conducting members arranged to provide said dissimilar thermoelectric elements and said members in electrical series and a plurality of heat activated bonding means operable at a predetermined elevated temperature to bond said thermoelectric elements and said electrically conducting members together in said series; heating said opposite sides and thus said elements to a temperature above said predetermined temperature; cooling the side of said unit adapted to have the lower temperature when in said operation until said temperature differential is achieved while maintaining said desired contour; and cooling both sides while maintaining said temperature differential.

3. The method of making a thermocouple unit, comprising: assembling a plurality of dissimilar thermoelectric elements laterally spaced from each other and all having opposite end portions in two spaced sets, two sets of a plurality of electrically conducting strips, one set of strips for each set of opposite end portions, said elements and strips being arranged in electrical series, and heat activated bonding means operable at a predetermined temperature to bond said end portions to said electrically conducting strips but being inoperable above said temperature, one side of said unit having a heated side and the other a cooled side when a direct current is passed through said electric series of elements and strips in normal operation so as to have a temperature differential between said sides; heating said unit to a temperature above said predetermined temperature; adjusting said heating to achieve said temperature differential; cooling said elements while substantially maintaining said temperature differential until all said bonding means are below said predetermined temperature, said heating and cooling being conducted while maintaining said elements and strips in fixed positions, said positions being those assumed by the elements and strips when said unit is in actual operation and subjected to said temperature differential; and cooling said unit to room temperature whereupon said unit becomes concavo-convex with said heated side being concave and said cooled side being convex in a prestressed condition.

4. The method of making a thermocouple unit, comprising: assembling a plurality of dissimilar thermoelectric elements laterally spaced from each other and all having opposite end portions in two spaced sets, two sets of a plurality of electrically conducting strips, one set of strips for each set of opposite end portions, said elements and strips being arranged in electrical series, a pair of thermal conducting members on opposite sides of said unit each having electrically insulating and heat conducting means for bonding said strips to said thermal conducting members and heat activated bonding means operable at a predetermined temperature to bond said end portions to said electrically conducting strips but being inoperable above said temperature, one of said thermal conducting members being a heated side and the other a cooled side when a direct current is passed through said electric series of elements and strips in normal operation so as to have a temperature differential between said members; heating said thermal conducting members to a temperature above said predetermined temperature; adjusting said heating to achieve said temperature differential between said members; cooling said members while substantially maintaining said temperature differential until all said bonding means are below said predetermined temperature, said heating and cooling being conducted while maintaining said members in fixed positions, said positions being those assumed by the members when said unit is in actual operation and subjected to said temperature differential; and cooling said unit to room temperature whereupon said unit becomes concavo-convex with said one member concave and said other member convex in a prestressed condition.

5. A thermocouple device, comprising: a thermocouple unit having a heated side and a cooled side when subjected to a direct current during normal operation and having a plurality of dissimilar thermoelectric elements, a plurality of electrically conducting members in two spaced sets, one set on the heated side of said unit and the other set on the cooled side of said unit, connecting said dissimilar elements in electrical series, and insulating means surrounding said elements; and heat transfer members adjacent each of said heated side set of said unit and cooled side set of said unit, said thermocouple unit having a distorted shape out of intimate heat transfer relationship with said heat transfer members when free of said current and having a normal shape in intimate heat transfer relationship with said heat transfer members when said unit is subjected to said current.

6. The unit of claim 5 wherein said shape is essentially flat when subjected to said current and essentially concavo-convex when free of said current.

References Cited in the file of this patent

UNITED STATES PATENTS

| | | |
|---|---|---|
| 2,959,925 | Frantti et al. | Nov. 15, 1960 |
| 2,976,340 | Heinicke et al. | Mar. 21, 1961 |
| 2,978,875 | Lackey et al. | Apr. 11, 1961 |